US007243976B2

(12) United States Patent

Okada et al.

(10) Patent No.: US 7,243,976 B2

(45) Date of Patent: Jul. 17, 2007

(54) OPENING AND CLOSING APPARATUS FOR OPENING AND CLOSING BODY OF VEHICLE

(75) Inventors: Hiroshi Okada, Yokohama (JP); Nao Mizumoto, Kanagawa (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/480,925

(22) Filed: Jul. 6, 2006

(65) Prior Publication Data

US 2007/0063536 A1 Mar. 22, 2007

(30) Foreign Application Priority Data

Sep. 20, 2005 (JP) ............................ 2005-271348

(51) Int. Cl.
*B60J 5/00* (2006.01)

(52) U.S. Cl. .................. 296/146.4; 296/56; 296/146.8; 49/341

(58) Field of Classification Search .................. 296/56, 296/146.4, 146.8, 146.9; 49/339–343, 346
See application file for complete search history.

(56) References Cited

U.S. PATENT DOCUMENTS 5,791,428 A * 8/1998 Noll et al. ............... 180/69.21
6,513,859 B2 * 2/2003 Yuge ....................... 296/146.4
6,637,157 B1 * 10/2003 Dombrowski et al. ........ 49/341
6,789,837 B2 * 9/2004 Mitsui et al. ............ 296/146.8
7,117,638 B2 * 10/2006 Ihashi ........................ 49/340
2002/0005650 A1 * 1/2002 Rogers et al. ................ 296/56
2002/0040551 A1 * 4/2002 Zhou .......................... 49/339
2004/0010974 A1 * 1/2004 Okada ......................... 49/341
2004/0104594 A1 * 6/2004 Shimura et al. ......... 296/146.8
2004/0124662 A1 * 7/2004 Cleland et al. .......... 296/146.4
2005/0023855 A1 * 2/2005 Omori et al. ................. 296/56
2005/0127711 A1 * 6/2005 Rigorth et al. ........... 296/146.4

FOREIGN PATENT DOCUMENTS

JP 2003-276441 A 9/2003

* cited by examiner

*Primary Examiner*—Jason Morrow
(74) *Attorney, Agent, or Firm*—Foley & Lardner LLP

(57) ABSTRACT

An opening and closing apparatus for an opening and closing body of a vehicle. The opening and closing apparatus includes a reciprocating member connected at its connecting portion to a motor so as to be moved to reciprocate along a plane perpendicular to a hinge shaft, the reciprocating member having a side surface parallel with the plane perpendicular to the hinge shaft. A connecting member is provided having a first end section pivotally attached to an end portion of the reciprocating member, and a second end section fixed to the opening and closing body. A deflection-suppressing device is provided to a stationary body connected to the vehicle body. A part of the side surface of the reciprocating member is slidably contacted with the deflection-suppressing device and is located between the connecting portion of the reciprocating member and the connecting member.

3 Claims, 5 Drawing Sheets

OPENING AND CLOSING APPARATUS FOR OPENING AND CLOSING BODY OF VEHICLE

BACKGROUND OF THE INVENTION

This invention relates to improvements in an opening and closing apparatus for an opening and closing body of a vehicle which apparatus is so arranged that the opening and closing body such as a rear gate of an automotive vehicle is moved to open and close with driving force of a motor.

A conventional opening and closing apparatus is disclosed in Japanese Patent Provisional Publication No. 2003-276441, in which a rack is connected to a motor disposed inside a roof of a vehicle body so as to be reciprocated in a fore-and-aft direction. A rear gate is pivotally attached to a rear part of a vehicle body so as to be movable to open and close. The rack is connected to the rear gate through a connecting member (hinge arm) to be reciprocated when the motor is operated to make rotations in normal and reverse directions, thereby to move the rear gate to open and close automatically.

SUMMARY OF THE INVENTION

However, drawbacks have been encountered in the above discussed conventional opening and closing apparatus in which the rack is reciprocated in the fore-and-aft direction thereby moving the opening and closing body to open and close. Specifically, the rack is moved to protrude largely rearward from a drive unit and a supporting portion at which an installation bracket supports the rack, as the rack moves the rear gate to open.

Therefore, when the rear gate is manually moved or moved by driving force of the motor so as to open or close, the rack is sometimes deflected or deformed in a lateral direction (or vehicle width direction) so as not to make the smooth open and close actions of the rear gate. In order to avoid this, it may be possible to increase a flexural rigidity of the rack by increasing the thickness of the rack, or to support a large longitudinal range of the rack by increasing the supporting portion of the installation bracket in dimension in the fore-and-aft direction; however, such an arrangement unfavorably increases the size and weight of the rack and the installation bracket.

In view of the above problems, an object of the present invention is to provide an improved opening and closing apparatus for an opening and closing body of a vehicle which apparatus can effectively overcome drawbacks encountered in conventional opening and closing apparatuses.

Another object of the present invention is to provide an improved opening and closing apparatus for an opening and closing body of a vehicle which apparatus is so arranged as to stably reciprocate a reciprocating member (such as the rack and the like) thereby smoothly moving the opening and closing body to open and close, without increasing the thickness of the connecting member and increasing the size of the installation bracket and the like.

A further object of the present invention is to provide an improved opening and closing apparatus for an opening and closing body of a vehicle which apparatus has the reciprocating member which is prevented from its lateral deflection even though the thickness of the reciprocating member is not increased.

According to the present invention, an opening and closing apparatus is for an opening and closing body of a vehicle, the opening and closing body being so supported to a vehicle body as to be movable around a hinge shaft to open and close. The opening and closing apparatus comprises a reciprocating member connected at its connecting portion to a motor so as to be moved to reciprocate along a plane perpendicular to the hinge shaft, the motor being provided to the vehicle body and operable to make rotations in normal and reverse directions, the reciprocating member having a side surface parallel with the plane perpendicular to the hinge shaft. A connecting member is provided having a first end section pivotally attached to an end portion of the reciprocating member, and a second end section fixed to the opening and closing body. A deflection-suppressing device is provided to a stationary body connected to the vehicle body. In this opening and closing apparatus, a part of the side surface of the reciprocating member is slidably contacted with the deflection-suppressing device in a manner to suppress a deflection of the reciprocating member, the part being located between the connecting portion of the reciprocating member and the connecting member.

DETAILED DESCRIPTION OF THE INVENTION

Figure 1:
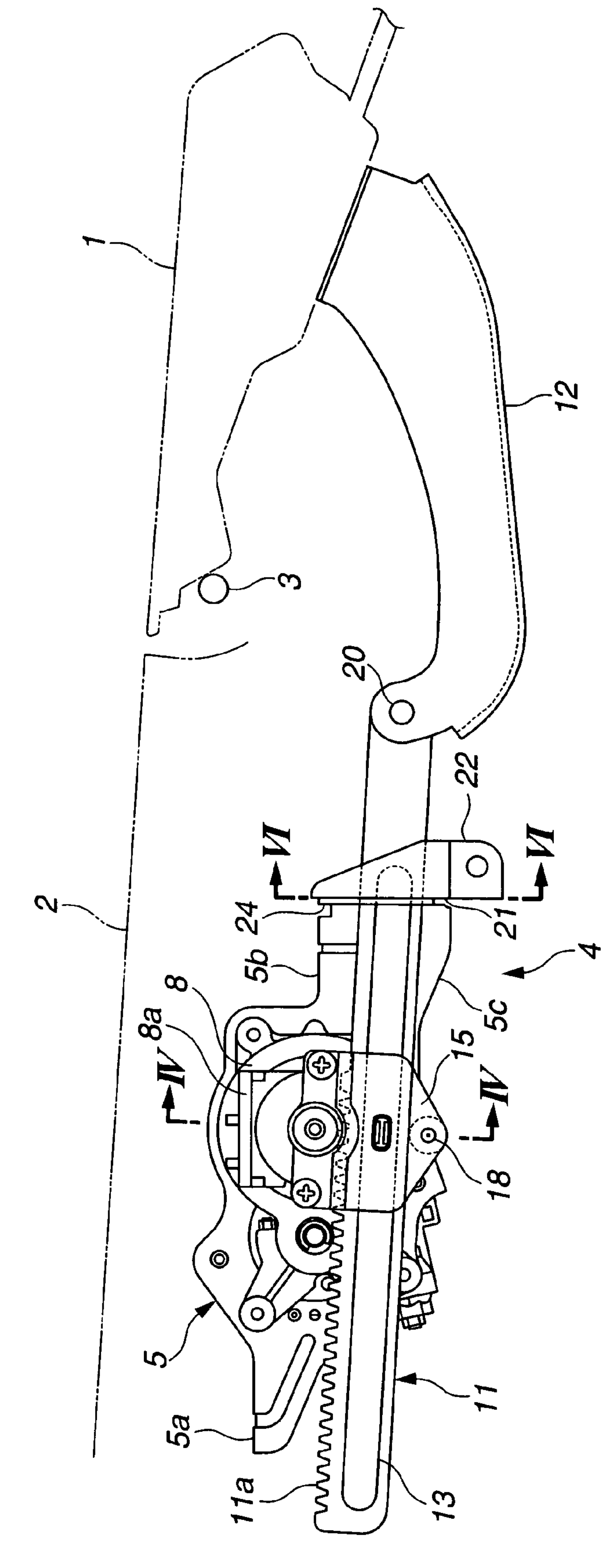
FIG. 1 is a side view of an embodiment of an opening and closing apparatus according to the present invention, showing a state where an opening and closing body is in a fully closed position.

Referring now to the accompanying drawings, an embodiment of an opening and closing apparatus for an opening and closing body of a vehicle, according to the present invention is illustrated by reference numeral 4 and discussed hereinafter.

Figure 2:
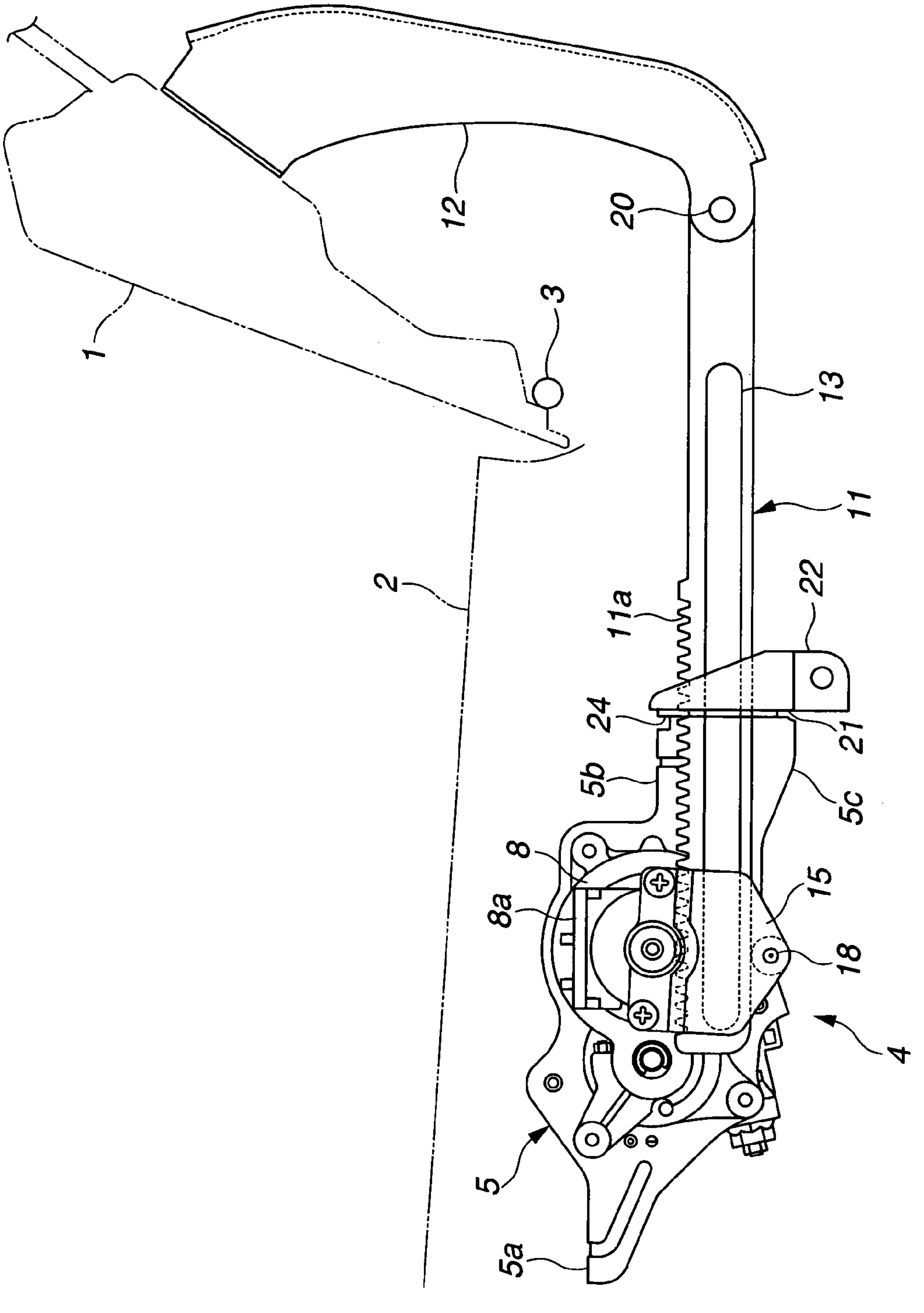
FIG. 2 is a side view similar to FIG. 1, but showing a state where the opening and closing body is in a fully opened position.
Figure 3:
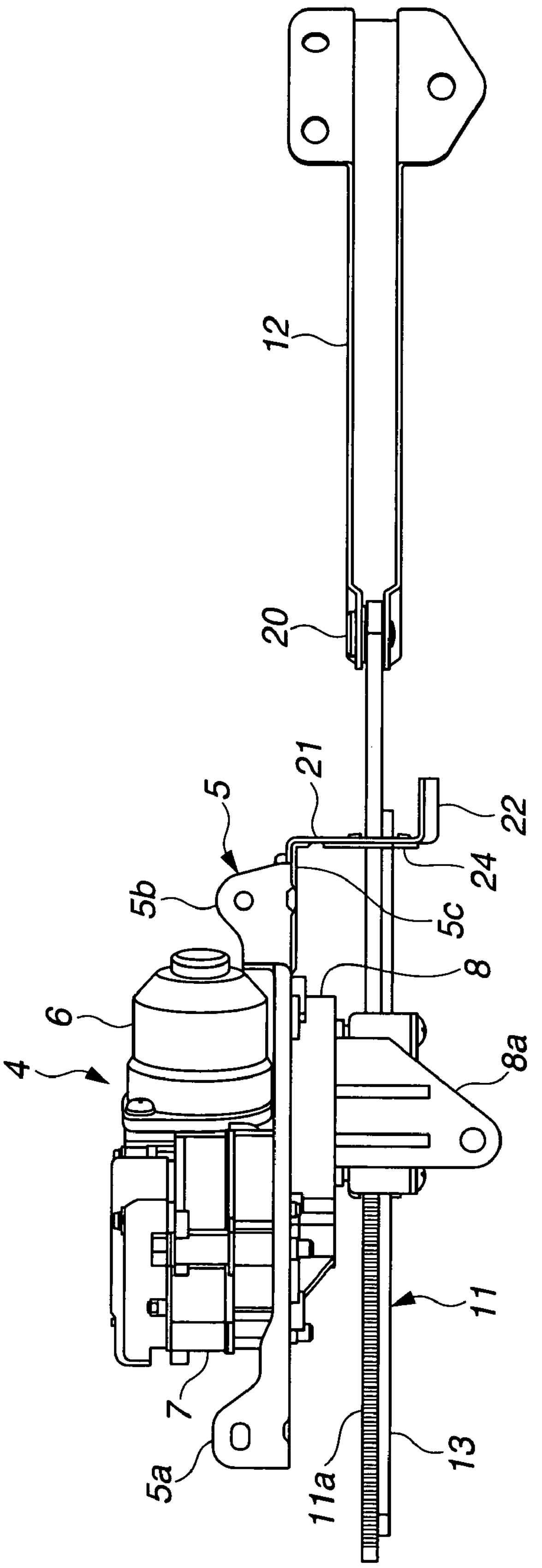
FIG. 3 is a top plan view of the opening and closing apparatus of FIG. 1, showing the state where the opening and closing body is in the fully closed position.
Figure 4:
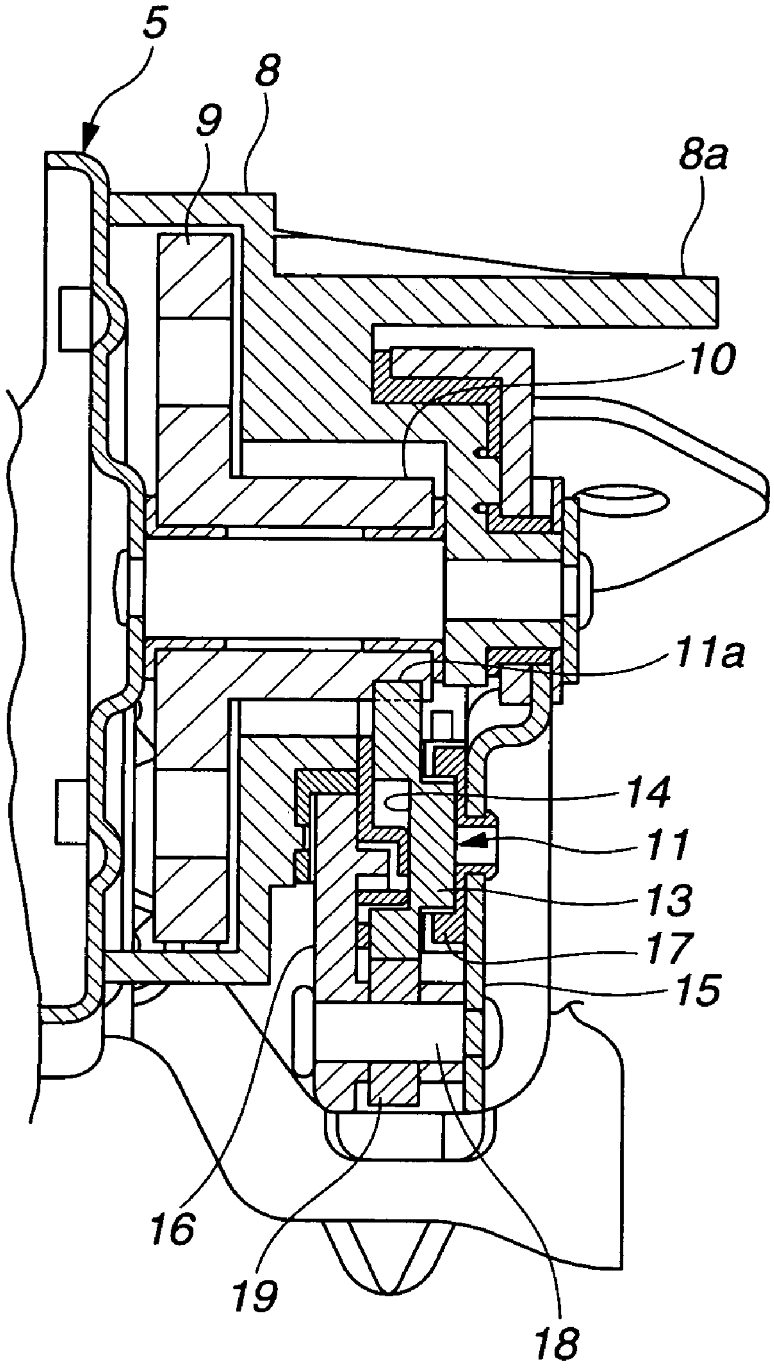
FIG. 4 is an enlarged vertical sectional view of the opening and closing apparatus of FIG. 1, taken generally along the plane indicated by lines IV—IV of FIG. 1.

FIG. 1 is a side view of the opening and closing apparatus 4 according to the present invention, showing a state where an opening and closing body is in a fully closed position. FIG. 2 is a side view similar to FIG. 1, but showing a state where the opening and closing body is in a fully opened position. FIG. 3 is a top plan view of the opening and closing apparatus 4, showing the state where the opening and closing body is in the fully closed position. FIG. 4 is an enlarged vertical sectional view of the opening and closing apparatus 4, taken generally along the plane indicated by lines IV—IV of FIG. 1. It is to be noted that a left side in FIG. 1 corresponds to a front side of the vehicle in the following description.

The opening and closing apparatus 4 is disposed in a vehicle body including the opening and closing body such as a rear gate 1. The vehicle body further includes a roof panel 2 serving as a stationary body. The rear gate 1 has an upper end portion pivotally attached to a rear end part of the roof panel 2 through a hinge shaft 3 extended in a lateral direction of the vehicle (or in vehicle width direction) so as to be vertically movable around the hinge shaft 3 to open and close when manually operated or operated by the opening and closing apparatus 4.

The opening and closing apparatus 4 includes an installation bracket 5 which is fixable to the roof panel 2 to be served as a part of the above stationary body. The installation bracket 5 has one side surface section to which a motor 6 rotatable in normal and reverse directions and a casing 7 are attached. The casing 7 houses a worm wheel engaged with a worm fixedly fitted on a rotational shaft of the motor 6, and an electromagnetic clutch, though not shown. The installation bracket 5 further has the other side surface section to which a gear case 8 is attached. The gear case 8 houses a reduction gear 9 to which driving force is to be transmitted from the motor 6 only when the electromagnetic clutch is operated or engaged. A pinion 10 is formed integral with the reduction gear 9. A rack 11 serves as a reciprocating member and is engaged with the pinion 10 to be reciprocated in a fore-and-aft direction of the vehicle. A connecting link 12 serves as a connecting member and has a front end section which is pivotally attached to a rear end portion (or a tip end portion) of the rack 11. An upper portion of a rear end section of the connecting link 12 is fixed to the rear gate 1.

Figure 6:
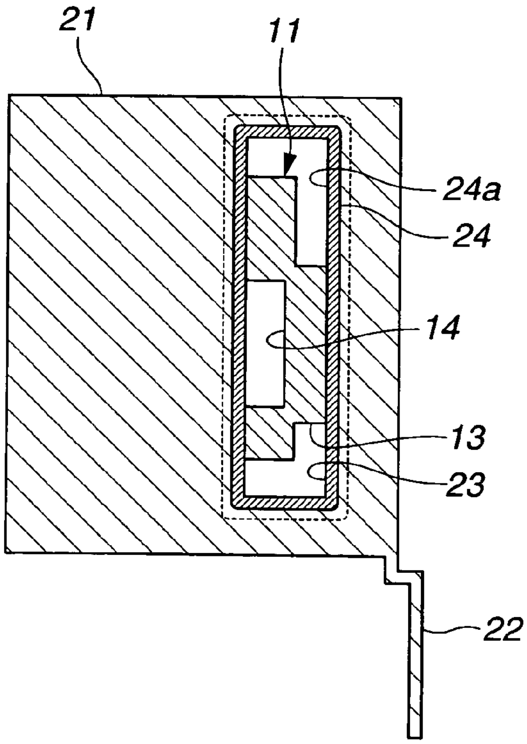
FIG. 6 is an enlarged vertical sectional view of an essential part of the opening and closing apparatus of FIG. 1, taken generally along the plane indicated by lines VI—VI of FIG. 1.

The rack 11 has an upper edge section whose forward half part includes a teeth portion 11*a* engaged with the pinion 10 at a lower section. Additionally, the rack 11 is so shaped as to have at one side surface portion an elongate projection 13 extended along a longitudinal direction of the rack 11 (or in the fore-and-aft direction of the vehicle) to the vicinity of the rear end portion of the rack 11, and additionally the other side surface portion of the rack 11 is formed with an elongate groove 14 extended parallel with the projection 13. As shown in FIG. 6, the groove 14 is located between the upper and lower sections of the other side surface portion of the rack 11 which upper and lower sections define "an inside surface of the rack 11". On the other hand, a top surface of the projection 13 is parallel with the inside surface of the rack 11 and serves as "an outside surface of the rack 11". The projection 13 is also located between the upper and lower sections of the one side surface portion of the rack 11.

The gear case 8 has an outer surface portion to which outside and inside rack supporting plates 15 and 16 are attached swingable in the fore-and-aft direction. A pin 18 is provided between lower end sections of the outside and inside rack supporting plates 15 and 16, the pin 18 being extended in a lateral direction of the vehicle. A roller 19 is supported rotatable around the pin 18. The rack 11 is inserted between the left and right side rack supporting plates 15 and 16 and extends in the fore-and-aft direction, and slidably contacted at its lower end surface with an upper surface of the roller 19. The projection 13 is slidably held by a slider 17 which is attached to the outside rack supporting plate 15 through an inner surface of the outside rack supporting plate 15 and formed of synthetic resin or the like.

With such an arrangement, the rack 11 can be reciprocated generally horizontally and in the fore-and-aft direction to take a closing position shown in FIG. 1 and an opening position shown in FIG. 2 while swinging vertically, upon rotations (in normal and reverse directions) of the pinion 10 connected to the motor 6.

The connecting link 12 is formed generally U-shaped in section by bending a plate material and therefore has two side wall sections facing to each other. The connecting link 12 is pivotally connected at its front end section to the rack 11 through a connecting pin 20 extended in the vehicle width direction in such a manner as to hold the rear end portion of the rack 11 between the two side wall sections of the connecting link 12. Hence, the connecting link 12 and the rack 11 are rotatable relative to each other. It will be understood that the connecting link 12 may be constituted of two plate materials. In this case, the two plate materials are connected to each other with a shaft or the like in such a manner that the side surfaces thereof face each other in order to reinforce the connecting link 12.

The installation bracket 5 has installation pieces 5*a* and 5*b* formed integral therewith, and is fixed to the roof panel 2 through the installation pieces 5*a* and 5*b*. The gear case 8 has an installation piece 8*a* formed integral therewith, and is fixed to the roof panel 2 through the installation piece 8*a*. Each of the installation pieces 5*a*, 5*b* and 8*a* is horizontally extended.

The installation bracket 5 further has an extending section 5*c* which is rearwardly extended parallel with the side surface of the rack 11 so that a rear end of the extending section 5*c* is located generally midway (in side view or in FIG. 1) between a rear end of the outside rack supporting plate 15 and a front end of the connecting link 12 which is in its closing position. A plate-shaped holding piece 21 is formed integral with the rear end of the extending section 5*c* which holding piece 21 vertically extends and is so bent as to extend outwardly to be perpendicular to a plane containing the side surface of the rack 11.

The holding piece 21 has an installation piece 22 through which the holding piece 21 is fixed to the roof panel 2 with a bolt. The installation piece 22 is formed integral with the holding piece 21 in such a manner as to be extended rearwardly and downwardly from an outside end portion (or a free end portion) of the holding piece 21.

Figure 5:
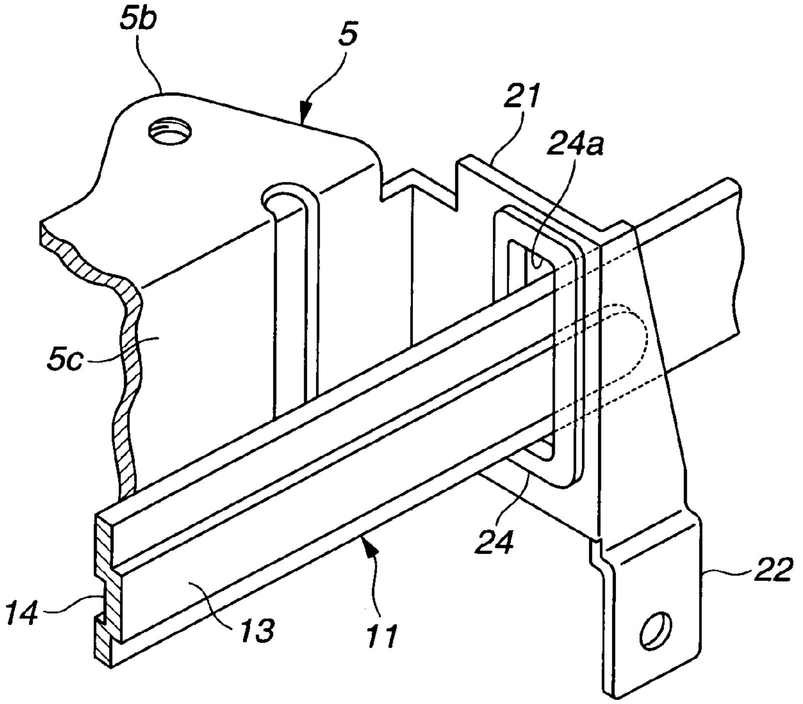
FIG. 5 is a fragmentary perspective view of an essential part of the opening and closing apparatus of FIG. 1, showing a section to which a deflection-suppressing device is installed, as viewed diagonally from the front side.

As shown in FIGS. 5 and 6, the holding piece 21 is formed with a vertically elongate insertion hole 23 through which the rack 11 pierces and freely movable. In order to prevent the rack 11 from deflection in a lateral direction, a deflection-suppressing device, i.e., a frame-shaped slide member 24 formed with a guide hole 24*a* is press-fitted at an inner peripheral portion of the holding piece 21 which portion defines the insertion hole 23.

The slide member 24 is made of hard synthetic resin such as polyacetal resin having a low coefficient of friction. The rack 11 has a middle portion located between an engaging portion (of the rack 11) engaged with the pinion 10 (i.e., a connecting portion (of the rack 11) connected to the motor 6) and the connecting link 12, and is slidably contacted at its middle portion with vertically elongate inner surfaces of an inner peripheral section defining the guide hole 24*a* which are parallel and face each other. In other words, the outside and inside surfaces of the rack 11 are slidably contacted with the vertically elongate inner surfaces of the inner peripheral section defining the guide hole 24*a*. It will be understood that the inner peripheral section defining the guide hole 24*a* is adapted to have a vertical dimension larger than that of the rack 11 since the rack 11 moves in the fore-and-aft direction while swinging vertically.

In operation of the opening and closing apparatus 4 discussed in the above embodiment, when an operation switch or remote controller (not shown) is operated in order to move the rear gate to open or close, driving force of the motor 6 is transmitted through the electromagnetic clutch to the reduction gear 9 and the pinion 10 formed integral with the reduction gear 9. With this, the rack 11 is moved rearward from its closing position shown in FIG. 1, so that the connecting link 12 whose front end section is pivotally attached to the rear end portion of the rack 11 is also moved rearward as shown in FIG. 2. Then, the rear gate 1 is pivotally moved upward around the hinge shaft 3 so as to reach its opened position.

As discussed above, the rack 11 movably pierces through the guide hole 24*a* of the slide member 24 provided to the holding piece 21 of the extending section 5*c* of the installation bracket 5, at its middle portion located between the engaging portion (of the rack 11) engaged with the pinion 10 and the front end section of the connecting link 12. With this, the rack 11 is moved rearward while its outside and inside surfaces (which are opposite in the direction parallel with the axis of the hinge shaft 3) are slidably held and guided, so as to be prevented from deflection and deformation in the lateral direction even though it is projected largely rearward from the pinion 10 and the outside and inside rack supporting plates 15 and 16.

Additionally, the installation piece 22 formed integral with the holding piece 21 is fixed to the roof panel 2 with a bolt so as to prevent the extending section 5*c* and the holding piece 21 from deflection and deformation in the vehicle width direction.

The rear gate 1 thus can smoothly and stably move to open without deflecting in the direction parallel with the axis of the hinge shaft 3.

This advantage can be obtained also when the rear gate 1 in its fully opened position is manually moved to close. In this case, the rack 11 is moved forward while being slidably held and guided through the guide hole 24*a* of the slide member 24 so as to be prevented from its deflection and deformation in the lateral direction, thereby stably moving the rear gate 1 to close.

With such an arrangement as to prevent the rack 11 from deflection and deformation in its lateral direction, it is unnecessary to increase a flexural rigidity of the rack 11 by increasing the thickness of the rack 11, and to increase a region of the rack 11 to be supported by increasing the outside and inside rack supporting plates 15 and 16 in dimension in the fore-and-aft direction. Therefore, any of the rack 11, the outside and inside rack supporting plates 15, 16 and the installation bracket 5 is not necessary to be large-sized, so that the opening and closing apparatus can be small in size and light in weight as a whole.

Although the invention has been described above by reference to a certain embodiment of the invention, the invention is not limited to the embodiment described above. Modifications and variations of the embodiment described above will occur to those skilled in the art, in light of the above teachings, as described below.

In the embodiment discussed above, the holding piece formed integral with the installation bracket 5 is formed with the insertion hole 23 in order not to lower the strength of the holding piece 21, and additionally the slide member 24 formed with a guide hole 24*a* is press-fitted at the inner peripheral portion of the holding piece 21 which portion defines the insertion hole 23, thereby preventing the rack 11 from deflection and the like. However, the outside and inside surfaces of the rack 11 may be guided through inner surfaces of the slide member 24 which is generally C-shaped in section so as to upward or downward open and press-fitted at the inner peripheral portion of the holding piece 21 which portion defines the insertion hole 23 and is generally C-shaped in section so as to upward or downward open.

Further, the slide member 24 may be so shaped as to slidably contact with only the outside and inside surfaces of the rack 11.

Furthermore, the outside and inside surfaces of the rack 11 may be directly guided by an inner peripheral surface (of the holding piece 21) defining the guide hole in order to prevent the lateral deflection of the rack 11, without using the slide member 24. Instead of forming such a guide hole, the holding piece 21 or the extending section 5*c* may be provided with a deflection-suppressing device such as a pair of guide pieces, a pair of protruding sections and the like which are arranged such that parts of them are slidably contacted with the outside and inside surfaces of the rack 11.

While both the outside and inside surfaces of the rack 11 have been shown and described as being slidably contacted with the vertically elongate inner surfaces of the inner peripheral section (of the slide member 24) defining the guide hole 24*a* in the above discussed embodiment, it will be understood that one of the outside and inside surfaces of the rack 11 may be slidably contacted with the vertically elongate inner surfaces of the inner peripheral section (of the slide member 24) defining the guide hole 24*a*.

The above deflection-suppressing device may be provided to other stationary body than the installation bracket 5, such as the roof panel 2 to which the opening and closing apparatus 4 is attached.

Principle of the present invention is applicable to an opening and closing apparatus using as the reciprocating member a rod, a link or the like which is connected to the motor 6 so as to be reciprocated, in place of the rack 11.

Additionally, principle of the present invention is applicable to an opening and closing apparatus for an opening and closing body such as a hood, a trunk lid, a side door whose hinge shaft is vertically extended, or the like, other than the above rear gate 1.

Technical ideas (a) to (e) disclosed in the above embodiment will be discussed together with advantages obtained thereby.

(a) An opening and closing apparatus is for an opening and closing body of a vehicle, the opening and closing body being so supported to a vehicle body as to be movable around a hinge shaft to open and close. The opening and closing apparatus comprises a reciprocating member connected at its connecting portion to a motor so as to be moved to reciprocate along a plane perpendicular to the hinge shaft, the motor being provided to the vehicle body and operable to make rotations in normal and reverse directions, the reciprocating member having a side surface parallel with the plane perpendicular to the hinge shaft. A connecting member is provided having a first end section pivotally attached to an end portion of the reciprocating member, and a second end section fixed to the opening and closing body. A deflection-suppressing device is provided to a stationary body connected to the vehicle body. In this opening and closing apparatus, a part of the side surface of the reciprocating member is slidably contacted with the deflection-suppressing device in a manner to suppress a deflection of the reciprocating member, the part being located between the connecting portion of the reciprocating member and the connecting member.

According to the idea (a), the reciprocating member is adapted to be slidably contacted at its side surface with the deflection-suppressing device. With this, the reciprocating member is restricted in its movement along the plane perpendicular to the hinge shaft when moved by the motor.

Therefore, the reciprocating member can be stably reciprocated so as to smoothly move the opening and closing body to open and close.

Moreover, even when a plate-shaped rack or the like is used as the reciprocating member, it is not necessary to increase the flexural rigidity of the rack by increasing the thickness of the rack, and therefore the reciprocating member can be small in size and light in weight.

(b) In the opening and closing apparatus as discussed in the idea (a), the deflection-suppressing device includes a section defining a guide hole through which the reciprocating member is slidably pierced.

According to the idea (b), it is sufficient that only the guide hole is formed in the stationary body in order to constitute the deflection-suppressing device, and therefore it is not necessary to particularly shape the deflection-suppressing device. In other words, the deflection-suppressing device can be formed without any difficulty. Further, such a simple arrangement that the stationary body is formed with the guide hole decreases a fear of lowering the strength of the stationary body, preventing the stationary body from deformation and the like, so that the reciprocating member can be stably moved.

(c) In the opening and closing apparatus as discussed in the idea (b), wherein the stationary body includes an installation bracket through which the motor and the reciprocating member are attached to the vehicle body, the installation bracket being provided with a holding piece extended perpendicular to a plane containing the side surface of the reciprocating member, the holding piece being formed with the guide hole.

According to the idea (c), the guide hole is formed at the holding piece of the installation bracket through which the motor and the reciprocating member are attached to the vehicle body, so that location of the reciprocating member and the guide hole can be achieved readily and accurately. With such a simple arrangement that the installation bracket is provided with the holding piece at which the guide hole is formed, the installation bracket can be prevented from being large-sized.

(d) In the opening and closing apparatus as discussed in the idea (c), the holding piece is provided at its free end portion with installation piece fixed to the vehicle body.

According to the idea (d), the free end portion of the holding piece is fixed to the vehicle body through the installation piece. With this, the holding piece is increased in strength thereby more reliably preventing the reciprocating member from deflection under the action of the guide hole formed at the holding piece, so that the opening and closing body can be more stably moved to open and close.

(e) In the opening and closing apparatus as discussed in any of the ideas (b) to (d), the section of the deflection-suppressing device which section defines the guide hole has a portion with which at least the side surface of the reciprocating member is slidably contacted, the portion forming a slide member low in coefficient of friction.

According to the idea (e), the reciprocating member can be reciprocated smoothly and silently without generating a significant noise due to sliding movement. Further, wear of the reciprocating member can be suppressed at the minimum level thereby improving durability of the reciprocating member.

The entire contents of Japanese Patent Application P2005-271348 (filed Sep. 20, 2005) are incorporated herein by reference.

What is claimed is:

1. An opening and closing apparatus for an opening and closing body of a vehicle, the opening and closing body being so supported to a vehicle body as to be movable around a hinge shaft to open and close, the opening and closing apparatus comprising:

a reciprocating member connected at a connecting portion to a motor so as to be moved to reciprocate along a plane perpendicular to the hinge shaft, the motor being provided to the vehicle body and operable to make rotations in normal and reverse directions, the reciprocating member having a side surface parallel with the plane perpendicular to the hinge shaft;

a connecting member having a first end section pivotally attached to an end portion of the reciprocating member, and a second end section fixed to the opening and closing body; and a deflection-suppressing device provided to a stationary body connected to the vehicle body, wherein a part of the side surface of the reciprocating member is slidably contacted with the deflection-suppressing device in a manner to suppress a deflection of the reciprocating member, the part being located between the connecting portion of the reciprocating member and the connecting member, wherein the deflection-suppressing device includes a section defining a guide hole through which the reciprocating member is slidably pierced, wherein the stationary body includes an installation bracket through which the motor and the reciprocating member are attached to the vehicle body, the installation bracket being provided with a holding piece extending perpendicular to a plane containing the side surface of the reciprocating member, the holding piece being formed with the guide hole.

2. An opening and closing apparatus as claimed in claim 1, wherein the holding piece is provided at its free end portion with an installation piece fixed to the vehicle body.

3. An opening and closing apparatus as claimed in claim 1, wherein the section of the deflection-suppressing device which defines the guide hole has a portion with which at least the side surface of the reciprocating member is slidably contacted, the portion forming a slide member low in coefficient of friction.

* * * * *